United States Patent Office 2,992,192
Patented July 11, 1961

2,992,192
HYDROXYALKYLATED POLYAMINES
Arthur K. Ingberman, Metuchen, N.J., assignor to Union Carbide Corporation, a corporation of New York
No Drawing. Original application July 27, 1956, Ser. No. 600,385. Divided and this application Apr. 29, 1957, Ser. No. 655,536
11 Claims. (Cl. 260—2)

This invention relates to novel hydroxyalkylated polyamines containing an aromatic ring in their structure and to their preparation. The invention further relates to the use of such polyamines as hardeners for polyepoxy compositions to form cured, thermoset, or infusible compositions having superior resistance to the action of solvents and acids than epoxide compositions cured with previously known polyamines.

The novel polyamines of this invention useful as hardeners for polyepoxy compounds are represented by the formula:

R'·NH·R''·(NH·R)x·NH₂ wherein R represents a divalent alkylene radical having the formula —C$_n$H$_{2n}$— wherein $n$ is an integer from 2 to 6, R'' represents either an alkylene radical as defined for R or an arylene radical containing from 6 to 8 carbon atoms such as phenylene (—C₆H₄—), methylphenylene (—C₆H₃·CH₃—), dimethylphenylene (—C₆H₂(CH₃)₂—)

xylylene (—CH₂—C₆H₄·CH₂—), and the like, R' is a monovalent radical selected from the group consisting of hydroxyalkyl and phenyl substituted hydroxyalkyl, x is an integer from zero to three, and with the provisos: that when R' represents phenyl substituted hydroxyalkyl then R'' represents an alkylene radical, and that when R'' represents an arylene radical then R' represents hydroxyalkyl and x is zero.

Specific hydroxyalkylated polyamines included by the above formula are the following:

N-(2-phenyl-2-hydroxyethyl)diethylenetriamine
HOCH(C₆H₅)·CH₂NHC₂H₄NHC₂H₄NH₂

N-(2-phenyl-2-hydroxyethyl)-1,2-diaminopropane
HOCH(C₆H₅)CH₂NHC₃H₇NH₂

N-(2-phenyl-2-hydroxyethyl)dipropylenetriamine
HOCH(C₆H₅)CH₂(NHC₃H₇)₂NH₂

N-hydroxyethyl m-xylylenediamine

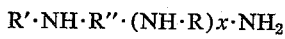
CH₂NHC₂H₄OH

N-hydroxyethyl m-phenylenediamine

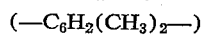
NHC₂H₅OH

N-hydroxypropyl m-phenylenediamine

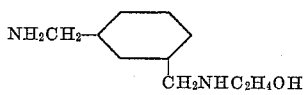

N-hydroxypropyl 2,5-toluenediamine

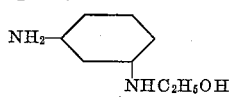

The above and other hydroxyalkylated polyamines contemplated herein can be readily prepared by the addition of a suitable olefine oxide to a polyamine, one of which reactants contains an aromatic ring, whereby there is obtained a hydroxyalkylated polyamine containing a single aromatic ring as for example: ethylene oxide and metaphenylenediamine to yield N-hydroxyethyl metaphenylenediamine, e.g.

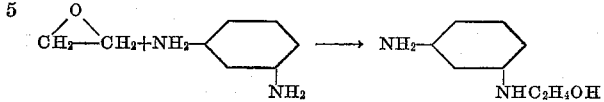

or styrene oxide and diethylene triamine yield N-(2-phenyl-2-hydroxyethyl) diethylenetriamine, e.g.

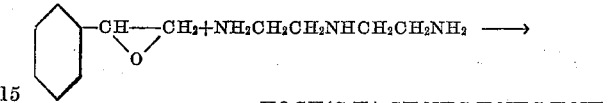

HOCH(C₆H₅)·CH₂NHC₂H₄NHC₂H₄NH₂

The reaction can be conducted under pressure if desired and either in the absence of any solvents or in the presence of water or an aliphatic alcohol at temperatures of from about 20° C. to the boiling point.

In reactions involving the relatively more reactive and more volatile oxides such as ethylene oxide and propylene oxide, it is generally preferred to add the olefine oxide to the polyamine at relatively low temperature, not over about 50° C., in order to maintain good reaction control and to minimize formation of by-products. With the relatively less reactive olefin oxides such as styrene oxide, on the other hand, it has been found more convenient to conduct the reaction at somewhat higher temperatures, about 100° C.

The best yields are generally obtained by employing an excess of polyamine, which minimizes formation of multi-substituted polyamine by-products. Unreacted polyamine is then removed as by distillation. Since the presence of more than about 10 percent unreacted polyamine in the final product causes primary skin irritation to most individuals, products containing not more than this amount, i.e., about 10 percent, of non-hydroxyalkylated polyamine are preferred and more particularly products substantially free of such unreacted polyamine.

Examples 1–5 illustrate the preparation of the new hydroxyalkyl polyamines. In these examples, except where otherwise indicated: all parts and percentages are by weight; refractive index is for sodium D line at 25° C., as measured with an Abbe refractometer; and neutralization equivalent, abberviated hereinafter as "neutr. eq.," was determined by titration in glacial acetic acid with perchloric acid to a methyl violet end point, and calculated as follows:

$$\text{neutr. eq.} = \frac{\text{sample weight}}{\text{(ml. acid used)(normality of acid)}}$$

where normality is determined by standardization against pure sodium carbonate using methyl violet indicator. Except as noted below, the neutr. eq. determined in this manner is equal to the number of grams of product containing one gram-equivalent of amino nitrogen. The neutr. eq. is therefore equal to the average molecular weight of the product divided by the average number of amino nitrogen atoms per molecule. However, amino groups and substituted amino groups which are attached directly to an aromatic ring, as for example, in a phenylene diamine, or in an N-hydroxyalkyl phenylene diamine, are less basic and titrate only one of their two amino groups. Consequently, the observed neutr. eq. of such a compound or of a mixture of such compounds is numerically equal to the molecular weight of the compound or average molecular weight of the mixture.

EXAMPLE 1

N-(2-phenyl-2-hydroxyethyl) diethylene triamine 1236 g. (12 moles) diethylene triamine and 250 ml. water were mixed together in a reaction vessel equipped with an agitator, thermometer, reflux condenser, and addition funnel. Then 288 g. (2.4 moles) styrene oxide was added slowly, with agitation, over a one hour period. Agitation was continued for 24 hours at room temperature, after which the reaction mass was heated to 100° C. and maintained at that temperature for 7 hours. The reaction mixture was transferred to a circulating flash evaporator and the water and some of the unreacted diethylene triamine was flashed off at about 85–90° C. and at about 10 mm. Hg pressure. The residue was fractionally distilled at reduced pressure and under nitrogen. The fraction distilling over at 192° C. at 3 mm. Hg was collected. This product was carefully refractionated in vacuo under nitrogen and yielded a refined sample of N-(2-phenyl-2-hydroxyethyl) diethylene triamine, a clear amber liquid having B.P.=162° C. at 2.4 mm. Hg, a refractive index of 1.5460, $\Delta n/\Delta t$ (i.e., temperature coefficient of refractive index per ° C.) of $-2.2 \times 10^{-4}$ and neutr. eq. of 74.3 (calc.=74.4).

EXAMPLE 2

N-(2-phenyl-2-hydroxyethyl) dipropylene triamine 1607 g. (12¼ moles) dipropylene triamine and 250 ml. water were mixed together, and then 288 g. (2.4 moles) styrene oxide was added over a 1 hour period, the reaction being continued overnight at room temperature, followed by a further reaction for 8 hours at 100° C. Water and some of the unreacted dipropylene triamine were flashed off in a circulating flash evaporator at 80–90° C. and about 10 mm. Hg pressure as in Example 1. The residue was fractionally distilled in vacuo under nitrogen and the fraction which distilled over at 183–183.5° C. and 2.8 mm. Hg was carefully refractionated in vacuo under nitrogen to provide a refined sample of N-(2-phenyl-2-hydroxyethyl) dipropylene triamine, which was a clear amber liquid having B.P.—197° C. at 3.1 mm. Hg, a refractive index of 1.5290, $\Delta n/\Delta t$ of $-3.67 \times 10^{-4}$ and a neutr. eq. of 84.0 (calc. =83.8).

EXAMPLE 3

N-(beta-phenyl-beta-hydroxyethyl)-1,2-diaminopropane 1480 g. (20 moles) 1,2-diaminopropane and 150 ml. water were mixed together and then 500 g. (4.2 moles) styrene oxide was added over a 1 hour period. The reaction was conducted overnight at room temperature and then for 7 hours at 100° C. Water and some of the unreacted diaminopropane was flashed off in a circulating flash evaporator at about 80–90° C. and about 10 mm. Hg pressure as in the previous examples. The residue was fractionally distilled at 2.25 mm. Hg pressure under nitrogen and the heart cut refractionated under nitrogen at 2.25 mm. pressure. The N-(beta-phenyl-beta-hydroxyethyl) 1,2-diaminopropane so obtained was a clear, substantially colorless liquid having a boiling point of 161° C. at 2.25 mm. Hg, refractive index of 1.5391, $\Delta n/\Delta t$ of $-5.0 \times 10^{-4}$, and a neutr. eq. of 97.2 (calc.=97.1).

EXAMPLE 4

N-hydroxyethyl m-phenylene diamine

A mixture consisting of 3300 g. (30.6 moles) m-phenylene diamine and 3300 g. water was cooled to 30° C. and 450 g. (10.2 moles) ethylene oxide sparged in over a 3½ hour period with vigorous agitation. During this period, the reaction mass temperature was maintained at 29° C.–43° C. The reaction mass was permitted to react overnight at room temperature, then vacuum dehydrated and concentrated in a circualting flash evaporator at about 80–90° C. (liquid temperature) and at about 10 mm. Hg pressure. The residue was fractionally distilled in vacuo under nitrogen and the fraction distilling over at 200–214° C. at 0.5–0.85 mm. Hg was collected. The 1041 g. distilled (67 percent of theoretical yield) N-hydroxyethyl m-phenylene diamine so prepared was a substantially colorless, viscous liquid having a refractive index of 1.6189 and neutralization equivalent of 155 (calc.=152).

The product of Example 4 was, in actuality, a supercooled liquid. A portion of said product stored at room temperature and observed 30 days later had solidified to a crystalline mass.

EXAMPLE 5

N-hydroxypropyl m-phenylene diamine

A mixture consisting of 6500 g. (60.2 moles) m-phenylene diamine and 5000 ml. water was cooled to 25° C. and 1160 g. (20 moles) propylene oxide was added dropwise over a 6.5 hour period with vigorous agitation. During this period, the reaction mass was maintained at 24–32° C. The reaction mass was permitted to react at room temperature over night, then vacuum dehydrated and concentrated in a circulating flash evaporator at about 80–90° C. (liquid temperature) and at about 10 mm. Hg pressure. The residue was fractionally distilled in vacuo under nitrogen to yield 5096 g. unreacted m-phenylene diamine and 1525 g. (71 percent of theory, based on unrecovered amine) of crude N-hydroxypropyl m-phenylene diamine which distilled over at 174–182° C. at 0.29–0.40 mm. pressure. The crude product was refractionated in vacuo under nitrogen to provide a refined product, boiling point 154–156° C. at 0.04–0.05 mm. Hg, which was a viscous, colorless liquid having a refractive index (at 22° C.) of 1.6045 and neutr. eq. of 166 (calc.=166).

The freshly distilled products of Examples 4 and 5 exhibited a tendency, characteristic of aromatic amino compounds, to darken on standing in air. Marked improvement in this respect was effected by incorporating therein about 0.5 percent triphenyl phosphite. Other suitable anti-oxidants and stabilizers may also be used for this purpose.

The hydroxyalkyl substituted polyamines containing an aromatic ring in their structure as herein described are particularly effective as hardeners for the polyglycidyl polyethers of dihydric phenols having an epoxy equivalency greater than 1.0. These polyglycidyl polyethers are usually prepared by reacting epichlorohydrin, preferably in excess, with a dihydric phenol in an alkaline medium such as sodium hydroxide. Among the simplest polyglycidyl polyethers are the diglycidyl ethers of dihydric mononuclear phenols such as resorcinol; but most commercial epoxide resins today are the epoxy derivatives of dihydric bisphenols such as the dihydroxydiphenyl alkanes and particularly 2,2-bis(p-hydroxyphenyl)-propane which is referred to by the trade as "Bisphenol-A."

Reference is had to the Bender et al. U.S. Patent No. 2,506,486 for a more complete description of the preparation of diglycidyl ethers of bisphenols. Inasmuch as the resinous diglycidyl ethers of "Bisphenol-A" have such widespread usage, the hardening action of the herein-described hydroxyalkyl substituted polyamines can be illustrated conveniently with respect thereto in comparison with conventional polyamine hardeners, although it is to be understood that other polyepoxy compositions such as the polyepoxy aromatic amines or polyamines as for example N,N-diglycidyl aniline commonly referred to as diglycidyl aniline or tetraglycidyl phenylene diamine and polyglycidyl thioethers of polythiols such as are described in copending application Serial No. 352,024 filed April 29, 1953, by Bender et al. Patent No. 2,731,437, can be hardened or cured advantageously with the hydroxyalkyl polyamines herein described and contemplated. Other suitable epoxy resins for hardening by the hydroxyalkyl polyamines include those made by epoxidizing dihydroxydiphenyl alkanes such as "Bisphenol-A" or diphenol reaction products of phenol and formaldehyde, or phenol-formaldehyde novolaks, or polyhydric aliphatic compounds such as glycerine, glycols, and the like, or unsaturated compounds such as bis-cyclopentenyl ether and the like, providing they contain more than one epoxide group per molecule.

Polyepoxy compounds and mixtures having an epoxy equivalency greater than one, i.e. containing an average of more than one epoxide group

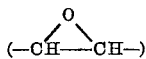

per molecule can be cured by reaction with a wide variety of polyfunctional compounds to hard, insoluble, infusible resinous products having many practical uses. For example, they may be reacted with polybasic acids or their anhydrides, polyhydric alcohols, polyphenols, polythiols, polyamides, or polyamines. Catalytic amounts of such compounds as alkali metal hydroxide, tertiary amines, or Lewis acids, such as aluminum chloride, boron trifluoride, or boron trifluoride complexes, zinc chloride, or stannic chloride have been proposed to accelerate the cure of polyepoxy compounds, but only the aliphatic alkylenepolyamines such as ethylene diamine, diethylene triamine, and triethylene tetramine exhibit a sufficient and controllable reactivity toward the oxirane ring to be generally useful for applications requiring initiation of cure at room temperature.

The aliphatic alkylene polyamines as a class, however, have various deficiencies. They are volatile, and their fumes are both noxious and disagreeable. Also, the curing reaction is highly exothermic, and since the heat of reaction evolved by their use is generated faster than it can readily be dissipated from the curing composition, the temperature of the mass rises rapidly. This causes unconsumed polyamine to bubble or even froth and thereby spoil the cured piece. To eliminate this difficulty, they are generally employed in a multi-stage process wherein an excess say about 4 moles of the polyamine is first reacted (or "adducted") with a portion of the epoxy resin, and this adduct is then cooled and incorporated into the main body of resin.

The aliphatic alkylene polyamines are strongly hydroscopic. This aggravates their fuming. Also, the absorbed moisture causes bubble formation during cure, tends to retard, and in severe cases, even prevents, proper cure. The cured pieces have relatively poor resistance to certain solvents such as acetone, sulphuric acid, and certain chlorinated hydrocarbons.

Furthermore, the aliphatic alkylene polyamines tend to absorb carbon dioxide from the atmosphere and they are skin irritants, toxic penetrants, and sensitizers. With susceptible individuals, direct contact may cause formation of pruritic rashes or skin cracking, and either direct contact or fumes may have a sensitizing effect which causes an allergic reaction in the form of skin redening or swelling. This contact dermatitis problem is particularly severe in epoxy resin applications, such as the preparation of tools, dies, jigs, and fixtures for metal forming enfilleting jobs such as autobody patching or "cold soldering," glass cloth or other lay-up type applications, and the like in which direct contact with the epoxy resin-hardener composition is virtually unavoidable.

It has now been found that compounds corresponding to the general formula shown supra, that is, hydroxyalkyl polyamines containing an aromatic ring either as a substituent in the hydroxyalkyl group or as an integral part of the parent polyamine structure attached to the amino nitrogen atoms directly or through an intermediate methylene bridge, are individually or in admixture effective hardeners for incorporation in polyepoxy compounds or compositions having an epoxy equivalency greater than one per average molecule to initiate curing of the polyepoxy compounds at room temperature.

The new hydroxyalkyl polyamines of this invention are superior to previously known epoxy resin hardeners possessing sufficient reactivity to be used in room temperature initiated curing operations in the following respects.

(1) They are less hygroscopic and less prone to scavenge carbon dioxide from the atmosphere. Consequently, bubble formation during curing of the epoxy resins caused by release of the carbon dioxide and water and the cure retarding and cure inhibiting effects of the water are minimized.

(2) They are sufficiently non-volatile to be used directly, i.e. without prior adduct formation, without giving rise to bubbles or froth during cure.

(3) Their lesser volatility and lesser hygroscopicity cooperate to reduce fuming markedly.

(4) Under normal conditions of use they cause little to no skin irritation.

For purposes of comparison, a resinous diglycidyl ether was made by reacting epichlorohydrin with 2,2-bis (p-hydroxyphenyl)propane in the presence of sodium hydroxide as catalyst and ethyl alcohol as solvent according to the procedure described in the Bender, et al. U.S. Patent No. 2,506,486. The resin so obtained, hereinafter identified as "Epoxy Resin A," had a specific gravity (at 25° C.) of 1.16, a viscosity (at 25° C.) of 15,000 cps. and an epoxy equivalent of 195. The term "Epoxy equivalent" signifies the number of grams resin containing one gram-mole epoxide group. It is measured by reacting the resin with pyridine hydrochloride, then back-titrating the unconsumed HCl with alcoholic KOH.

In subsequent Tables I and II the hardening action provided by representative hydroxyalkyl polyamines and the properties of the thermoset or hardened resinous products obtained therefrom are compared with those obtained with other polyamines, namely, diethylene triamine (DETA) and N-hydroxyethyl diethylene triamine (HEDETA).

TABLE I

| Epoxy Composition Hardener | 1 DETA | 2 HEDETA | 3 Product of Ex. 1 | 4 Product of Ex. 4 | 5 Product of Ex. 5 |
|---|---|---|---|---|---|
| Parts hardener used per 100 parts Epoxy Resin A | 10.6 | 19.0 | 28.6 | 26.0 | 28.4 |
| Pot Life (min.) | [1] 34 | 23 | 18 | [3] 148 | [3] 210 |
| Peak Exotherm (° C.) | [1] >200 | 225 | 200 | 48 | 40 |
| Heat Distortion Temp. (° C.) | [2] 103 | 92 | 93 | 105 | 116 |
| Izod Impact (ft. lbs./in. width) | [2] 0.2 | 0.2 | 0.6 | 0.3 | 0.8 |
| Rockwell Hardness (M scale) | [2] 101 | 93 | 97 | 126 | 106 |
| Ultimate Compressive Strength (p.s.i.) | [2] 36,000 | 39,000 | 39,000 | 30,000 | 45,200 |
| Compressive Yield Strength (p.s.i.) | [2] 16,000 | 14,000 | 15,000 | 27,350 | 19,000 |
| Ultimate Flexural Strength (p.s.i.) | [2] 14,000 | 15,000 | 12,500 | 12,200 | 22,100 |
| Flexural Modulus of Elasticity (p.s.i.) | [1] 470,000 | 400,000 | 525,000 | 776,000 | 570,000 |

[1] Determined by adding DETA directly to total charge of epoxy resin; the final cured piece contained numerous bubbles.
[2] To avoid bubble formation in the cured piece which would affect mechanical properties, the DETA was first reacted with a small portion of the epoxy resin to form an adduct and this intermediate after cooling was added to the remainder of the epoxy resin.
[3] To reach a "B" stage of cure. Require short after-cure at 60-150° C. to attain complete cure. This behavior is characteristic of aromatic polyamine hardeners and their derivatives when used to harden small masses and thin films.

The gel time or pot life and peak exotherm temperature were determined in the following manner. Ffty grams of Epoxy Resin A and the appropriate weight of hardener were mixed together at room temperature for two minutes. Fifty grams of this mixture was poured into a 4-oz. paper cup; cup and contents were placed in a constant temperature box at 25° C. and an iron-constantin thermocouple positioned exactly in the center of the curing mass. The time elapsed between the initial addition of the hardener to the resin and attainment of an immobile, substantially hard state was recorded as the gel time (or pot life). The maximum temperature registered by the thermocouple on a recording potentiometer was noted as the peak exotherm. It generally, but not invariably, occurred about 0.5–1.5 minutes after gel. The transition from the fluid, mobile condition to an immobile, substantially hard mass (gelation) occurs abruptly and sharply within an interval of only a few seconds, and is therefore easily distinguished.

The mechanical and solvent resistance properties were obtained as follows. Bar castings 0.25" x 1.25" x 8" were prepared by allowing the indicated resin-hardener composition to gel under room temperature curing conditions then after-cured for two hours at 120° C. Test pieces were then machined from these castings and tested as prescribed by ASTM procedures.

The ASTM procedure numbers are listed below together with two reference levels for each property. It should be borne in mind that the so-called "exacting" applications usually place a premium on one or more particular properties—not on all properties simultaneously. Consequently, a hardener which provides cured compositions displaying a high degree of even one property and acceptable degrees of the other properties may well be particularly advantageous for certain applications.

| Property | ASTM Proc. No. | Minimum Acceptable Values | |
|---|---|---|---|
| | | Gen'l Purpose Applications | Exacting Applications |
| 1. Heat Distortion | D-648-45T | 50° C | 75–125° C. |
| 2. Izod Impact | D-256-47T | 0.15 ft. lbs./in. width. | 0.20 ft. lbs./in. width. |
| 3. Rockwell Hardness | D-785-51 | 60 (M scale) | 80 (M scale). |
| 4. Compressive Yield Strength. | D-695-52T | 12,000 p.s.i. | 12,000 p.s.i. |
| 5. Ultimate Compressive Strength. | D-695-52T | 25,000 p.s.i. | 25,000 p.s.i. |
| 6. Ultimate Flexural Strength. | D-790-49T | 12,000 p.s.i. | 12,000 p.s.i. |
| 7. Flexural Modulus of Elasticity. | D-790-49T | 400,000 p.s.i. | 400,000 p.s.i. |
| 8. Solvent Resistance | C-543-43 | | |

Generally, compressive yield (4) is a more useful index than ultimate compressive (5) and flexural modulus (7) more useful than ultimate flexural (6) since they (4 and 7) indicate resistance to deformation or dimensional stability under stress. Moderately low values of (5) and (6) are therefore tolerated for many applications so long as (4) and (7) are acceptable.

Both the curing behaviors of the hardenable composition, i.e., the cure speed and peak exotherm temperature, and the properties of the cured product depend to some extent, on the hardener to epoxy resin ratio employed. Optimum strength, hardness and heat distortion are generally achieved with equivalent proportions of resin and hardener, i.e. proportions providing one gram-atom of amino hydrogen per gram-mole epoxide group. However, non-equivalent proportions ranging from about 0.25 to about 2.0, preferably from about 0.5 to about 1.75, equivalents of hardener per equivalent weight polyepoxy resin can also be used and such non-equivalent proportions are, in fact, preferred for some applications for the following reasons.

Strength properties, e.g. compressive, flexural, and impact, are not altered significantly by deviating, within a fairly wide range, from equivalent resin-hardener proportions. Heat distortion temperature and hardness are reduced by using either more or less than equivalent amounts of hardener (with too little hardener being more damaging in this respect, as a rule, than too much hardener). Gel and cure speed and peak exotherm temperature can be increased or decreased, by respectively increasing or decreasing the hardener to resin ratio. Consequently, in some applications, more than an equivalent proportion of hardener is favored because the economy which results from the shorter cure cycles so effected outweighs the attendant disadvantages. Alternatively, in other applications such as in the preparation of tools, dies, and the like in which the attainment of prescribed dimensions to within narrow tolerances is of paramount importance, a low peak exotherm temperature is virtually essential to minimize thermal shrinkage in the mold; and the ability to shift the curing characteristic in this direction, e.g., by employing less than an equivalent proportion of hardener, frequently outweighs the minor concomitant loss in other properties.

Table II illustrates the superior solvent resistance obtained by curing epoxide resins with the novel hydroxyalkylated polyamines herein described in comparison with the same epoxide resin cured with a hydroxyalkyl alkylene polyamine having no aromatic ring in its structure, namely N-hydroyethyl diethylene triamine (HEDETA). The cured epoxy compositions in Table II identified as 2, 3, and 5 correspond to the same numbered compositions in Table I.

TABLE II

| Epoxy Composition Hardener | Percent Weight Gain after 7 Days Immersion at 25° C.[2] | | |
|---|---|---|---|
| | 2 HEDETA | 3 Product of Ex. 1 | 5 Product of Ex. 5 |
| Solvent: | | | |
| Acetone | (¹) | 2.82 | 2.37 |
| Ethyl ether | 1.05 | 0.06 | 0.10 |
| 30% sulfuric acid | 3.10 | 0.24 | 0.76 |
| Trichloroethylene | (¹) | 0.12 | 0.08 |

[1] Absorbed so much solvent as to lose its rigidity and hardness and become flexible and rubbery.
[2] As determined by ASTM procedure C-543-43.

In general, the hardeners and resin-hardener compositions of this invention can be used in the same applications and in the same manner as those previously known. For example, they may be used to cast tools, dies, jigs, and fixtures, for encapsulating and potting, for laminating, bonding, and the like. Fillers of virtually any sort may be employed, such as glass, mineral materials, cellulosics, metal powders and woods, synthetic resins (cured) and the like. The curing reaction may be initiated and/or accelerated with moderate heat input such as provided by infra-red lamps, particularly in laminating or enfilleting applications and the like. Post curing cycles may be used (i.e., at elevated temperatures) to improve heat distortion, hardness, and chemical resistance, or the entire cure may be conducted at elevated temperatures in bonding applications and the like in which the resin layer is relatively thin and the exothermic heat of reaction can therefore be dissipated readily.

This is a divisional application of my application Serial No. 600,385 filed July 27, 1956.

What is claimed is:

1. Hardenable composition comprising an oxirane epoxide having an epoxy equivalency of greater than one selected from the group consisting of polyglycidyl ethers of polyhydric phenols and N,N-diglycidyl aniline, and a polyamine containing an aromatic ring in its structure and having the formula:

$$R'—NH—R''—NH_2$$

wherein R'' represents an arylene radical containing from 6 to 8 carbon atoms and R' represents hydroxyalkyl, said polyamine being present in said composition in a quantity sufficient to harden said composition to an infusible product.

2. Hardenable composition comprising an oxirane epoxide having an epoxy equivalency of greater than one selected from the group consisting of polyglycidyl ethers of polyhydric phenols and N,N-diglycidyl aniline, and a polyamine containing an aromatic ring in its structure and having the formula:

$$R'—NH—R''—NH_2$$

wherein R'' represents an arylene radical containing from 6 to 8 carbon atoms and R' represents hydroxyalkyl, said polyamine being present in said composition in a quantity of from about 0.25 to about 2.0 equivalents per equivalent weight of said epoxide.

3. Hardened product of the composition defined in claim 2.

4. Hardenable composition as defined in claim 2 wherein the said polyamine is present in said composition in a quantity of from about 0.5 to about 1.75 equivalents per equivalent weight of said epoxide.

5. Hardened product of the composition defined in claim 4.

6. Hardenable composition as defined in claim 2 wherein the said epoxide is a polyglycidyl ether of a polyhydric phenol.

7. Hardenable composition as defined in claim 2 wherein the said polyamine is N-hydroxyethyl m-phenylene diamine.

8. Hardened product of the composition defined in claim 7.

9. Hardenable composition as defined in claim 2 wherein the said polyamine is N-hydroxypropyl m-phenylene diamine.

10. Hardenable composition as defined in claim 2 wherein the said epoxide is diglycidyl ether of 2,2-bis(p-hydroxyphenyl)propane and wherein the said polyamine is N-hydroxyethyl m-phenylene diamine.

11. Hardened product of the composition defined in claim 1.

References Cited in the file of this patent
UNITED STATES PATENTS

| | | |
|---|---|---|
| 2,723,241 | De Groote et al. | Nov. 8, 1955 |
| 2,742,448 | Beacham et al. | Apr. 17, 1956 |
| 2,864,775 | Newey | Dec. 16, 1958 |